(No Model.)
F. E. FISHER.
ELECTRIC MOTOR.
No. 335,998. Patented Feb. 9, 1886.
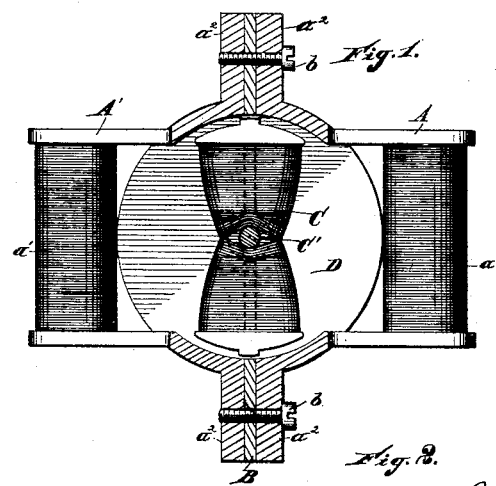
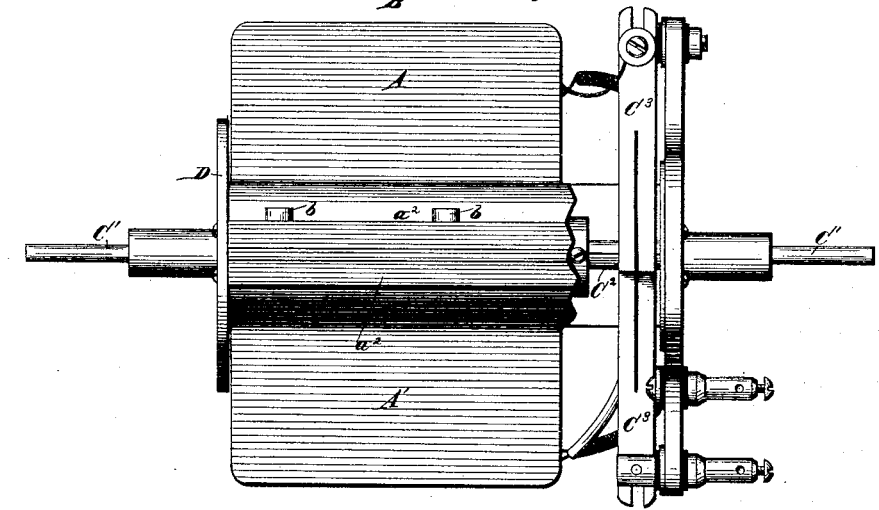
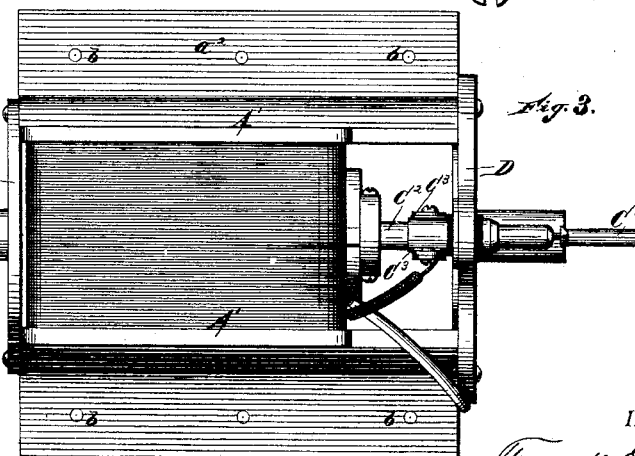
WITNESSES
Jno. E. Wiles.
Samuel E. Thomas
INVENTOR
Frank E. Fisher
By W. W. Leggett
Attorney

UNITED STATES PATENT OFFICE.

FRANK E. FISHER, OF DETROIT, MICHIGAN.

ELECTRIC MOTOR.

SPECIFICATION forming part of Letters Patent No. 335,998, dated February 9, 1886.

Application filed April 20, 1885. Serial No. 162,820. (No model.)

*To all whom it may concern:*

Be it known that I, FRANK E. FISHER, of Detroit, county of Wayne, State of Michigan, have invented a new and useful Improvement in Electric Motors; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

In the drawings, Figure 1 is a view in section and elevation of a device embodying my invention. Fig. 2 is a plan view of the same with a part of the frame broken away, so as to show the commutator and brushes. Fig. 3 is a side elevation.

My improvement consists, essentially, first, in forming each field-magnet in general U shape wound about the middle of the loop, the said field-magnets having their corresponding poles brought together adjacent to each other and fastened together upon an interposed piece of diamagnetic metal; also, in arranging the winding of the field-magnets with respect to the armature, so that there shall be a considerable intervening space, thereby affording a free circulation of air, whereby heat is avoided and the air caused to afford the least resistance to the revolution of the armature.

A represents one of the field-magnets, and A' the other. They are wound, respectively, along their loops at $a$ and $a'$. These magnets are of iron, and, as is seen, they possess a general U form. Each is provided with outstanding flanges $a^2$.

B B are pieces of brass or other diamagnetic metal interposed between the flanges $a^2$, and the whole are then bound together by screws or other fastenings, $b$, likewise of diamagnetic metal.

C is the armature; C', the shaft; C$^2$, the commutator; C$^3$, the brushes.

D represents the heads or ends of the machine, which are made preferably of diamagnetic metal. The magnets are so wound as to cause the positive poles of the magnets to come adjacent to each other and the negative poles to come likewise adjacent to each other, as is usual with dynamo-electric machines.

The peculiarity of this machine rests in the fact of the magnets coming together upon an interposed diamagnetic metal. There are therefore two positive poles brought closely together upon opposite sides of the diamagnetic metal and two negative poles similarly arranged in a position diametrically opposite the former.

The winding of the field-magnets is located, as shown, so as to afford a thorough circulation of air about the armature, and to prevent, as far as possible, all resistance which might be afforded by compression of air between the armature and field-magnets.

Instead of the diamagnetic metal, an insulator—such as rubber or fibrous fiber—might be employed and effect a very good result, although I prefer to employ the diamagnetic metal.

What I claim is—

1. In an electric motor, two field-magnets brought together upon interposed pieces of diamagnetic material and fastened by diamagnetic fastenings, substantially as and for the purpose described.

2. In an electric motor, two field-magnets brought together upon diamagnetic material, in connection with two heads supporting the shaft of the armature, said heads being likewise of diamagnetic material, substantially as described.

3. In an electric motor, two U-shaped magnets wound about their loops and provided with outwardly-projecting flanges at their extremities, said magnets brought together upon interposed diamagnetic metal and fastened together by diamagnetic screws passed through the flanges, substantially as described.

4. An electric motor consisting of two pieces of soft iron of substantially U form, fastened together at their extremities upon interposed pieces of diamagnetic metal, and in connection therewith an armature journaled in diamagnetic heads, said magnets arranged with respect to the armature, substantially as described, so as to leave large open spaces for free circulation of air, substantially as set forth.

In testimony whereof I sign this specification in the presence of two witnesses.

FRANK E. FISHER.

Witnesses:
N. S. WRIGHT,
M. B. O'DOGHERTY.